(12) United States Patent
Doljack

(10) Patent No.: US 9,020,648 B2
(45) Date of Patent: Apr. 28, 2015

(54) ZERO POWER APPLIANCE CONTROL, SYSTEMS AND METHODS

(75) Inventor: Frank Anthony Doljack, Pleasanton, CA (US)

(73) Assignee: Cooper Technologies Company, Houston, TX (US)

( * ) Notice: Subject to any disclaimer, the term of this patent is extended or adjusted under 35 U.S.C. 154(b) by 567 days.

(21) Appl. No.: 13/301,455

(22) Filed: Nov. 21, 2011

(65) Prior Publication Data

US 2012/0271468 A1 Oct. 25, 2012

Related U.S. Application Data

(60) Provisional application No. 61/476,904, filed on Apr. 19, 2011.

(51) Int. Cl.
- *G06F 1/26* (2006.01)
- *G06F 1/32* (2006.01)
- *H02J 3/14* (2006.01)
- *H02J 7/00* (2006.01)
- *H02J 9/00* (2006.01)

(52) U.S. Cl.
CPC . *H02J 9/005* (2013.01); *H02J 3/14* (2013.01); *G06F 1/26* (2013.01); *G06F 1/32* (2013.01); *H02J 7/00* (2013.01)

(58) Field of Classification Search
CPC .............. G06F 1/32; G06F 1/26; G05F 1/44; H02M 3/1584; H02M 3/155; H02J 3/14; H02J 7/00; H02J 9/005
USPC .................. 700/286, 297; 323/282, 268, 224; 713/324, 323, 340; 307/66; 320/167
See application file for complete search history.

(56) References Cited

U.S. PATENT DOCUMENTS

| | | | |
|---|---|---|---|
| 4,583,035 A | 4/1986 | Sloan | |
| 5,000,275 A * | 3/1991 | Bullivant | 177/21 OR |
| 5,260,637 A | 11/1993 | Pizzi | |
| 6,081,101 A | 6/2000 | Yang | |

(Continued)

FOREIGN PATENT DOCUMENTS

| | | |
|---|---|---|
| EP | 1087494 A2 | 3/2001 |
| EP | 2383861 A2 | 11/2011 |
| WO | 2010099483 A2 | 9/2010 |

OTHER PUBLICATIONS

International Preliminary Report of Patentability of International Application No. PCT/US2012/032103; Oct. 31, 2013; 5 pages.

(Continued)

*Primary Examiner* — Robert Fennema
*Assistant Examiner* — Jennifer L Norton
(74) *Attorney, Agent, or Firm* — Armstrong Teasdale LLP

(57) ABSTRACT

Power management controls for electrical appliances and devices include a supercapacitor and processor based controls for automatically disconnecting the appliance or device from a main power supply when not in active use. The control may include a micropower controller that enters a very lower power sleep mode and may wake up for limited times to detect and respond to various states of the appliance and the supercapacitor by connecting or disconnecting the appliance and a main power supply, all while drawing effectively zero power from the main power supply. The control may be interrupted when the appliance is switched on for active use.

41 Claims, 2 Drawing Sheets

(56) References Cited

U.S. PATENT DOCUMENTS

| | | | |
|---|---|---|---|
| 6,339,314 B1 | 1/2002 | Bruning | |
| 6,742,630 B2 | 6/2004 | Eilinger | |
| D522,463 S | 6/2006 | Novotney et al. | |
| 7,253,594 B2 * | 8/2007 | Paul et al. | 323/268 |
| 7,268,561 B2 | 9/2007 | Zhu | |
| 7,331,426 B2 | 2/2008 | Jahkonen | |
| D588,545 S | 3/2009 | Andre et al. | |
| 7,552,350 B2 * | 6/2009 | Fung | 713/320 |
| D601,097 S | 9/2009 | Novotney et al. | |
| D604,253 S | 11/2009 | Andre et al. | |
| 7,646,620 B2 | 1/2010 | MacDonald et al. | |
| D611,415 S | 3/2010 | Andre et al. | |
| 7,692,411 B2 | 4/2010 | Trainor et al. | |
| 7,770,039 B2 | 8/2010 | DuBose | |
| 7,779,278 B2 | 8/2010 | DuBose | |
| 7,781,908 B2 | 8/2010 | DuBose et al. | |
| D623,136 S | 9/2010 | Andre et al. | |
| 7,795,759 B2 | 9/2010 | DuBose et al. | |
| 7,795,760 B2 | 9/2010 | DuBose et al. | |
| 7,800,252 B2 | 9/2010 | DuBose et al. | |
| 7,904,738 B2 | 3/2011 | DuBose | |
| 7,908,498 B2 | 3/2011 | DuBose | |
| 7,910,834 B2 | 3/2011 | McGinley et al. | |
| 7,960,648 B2 | 6/2011 | McGinley et al. | |
| 7,967,610 B2 | 6/2011 | Lynch et al. | |
| 7,977,823 B2 | 7/2011 | DuBose et al. | |
| 7,982,439 B2 | 7/2011 | Trainor et al. | |
| 8,063,618 B2 * | 11/2011 | Lam et al. | 323/282 |
| D653,213 S | 1/2012 | Andre et al. | |
| 8,174,380 B2 | 5/2012 | Travis et al. | |
| 8,214,677 B2 * | 7/2012 | Burton et al. | 713/324 |
| 8,400,862 B2 * | 3/2013 | Tejada | 365/227 |
| 2006/0075152 A1 | 4/2006 | Zhu | |
| 2006/0161792 A1 | 7/2006 | Paul et al. | |
| 2009/0001938 A1 | 1/2009 | Vantu et al. | |
| 2009/0128099 A1 | 5/2009 | Minkkinen | |
| 2011/0001485 A1 | 1/2011 | Feight et al. | |
| 2011/0051476 A1 | 3/2011 | Manor et al. | |
| 2011/0074360 A1 | 3/2011 | Kerr et al. | |
| 2012/0271468 A1 | 10/2012 | Doljack | |
| 2013/0093242 A1 * | 4/2013 | Mok et al. | 307/23 |
| 2013/0207455 A1 * | 8/2013 | Doljack | 307/9.1 |

OTHER PUBLICATIONS

International Search Report and Written Opinion of PCT/US2012/032103; Jul. 5, 2012; 9 pages.

* cited by examiner

ZERO POWER APPLIANCE CONTROL, SYSTEMS AND METHODS

CROSS REFERENCE TO RELATED APPLICATION

This application claims the benefit of U.S. Provisional Application Ser. No. 61/476,904 filed Apr. 19, 2011, the entire disclosure of which is hereby incorporated by reference in its entirety.

BACKGROUND OF THE INVENTION

The field of the invention relates generally to electrical power management control systems for electronic devices and appliances, and more specifically to electronic controls for minimizing energy consumption of electrical appliances and devices when not in active use.

For various reasons, electrical energy consumption is being increasingly scrutinized by residential and business customers. Much effort has been made in recent years to provide appliances of all types that consume reduced amounts of electrical energy in use. Such appliances have been well received in the marketplace and are highly desirable for both residential and commercial consumers of electrical power. While great strides have been made in providing electrical appliances that reduce electrical energy consumption compared to conventional appliances, the appetite for still further energy consumption savings remains.

DETAILED DESCRIPTION OF THE INVENTION

Figure 1:
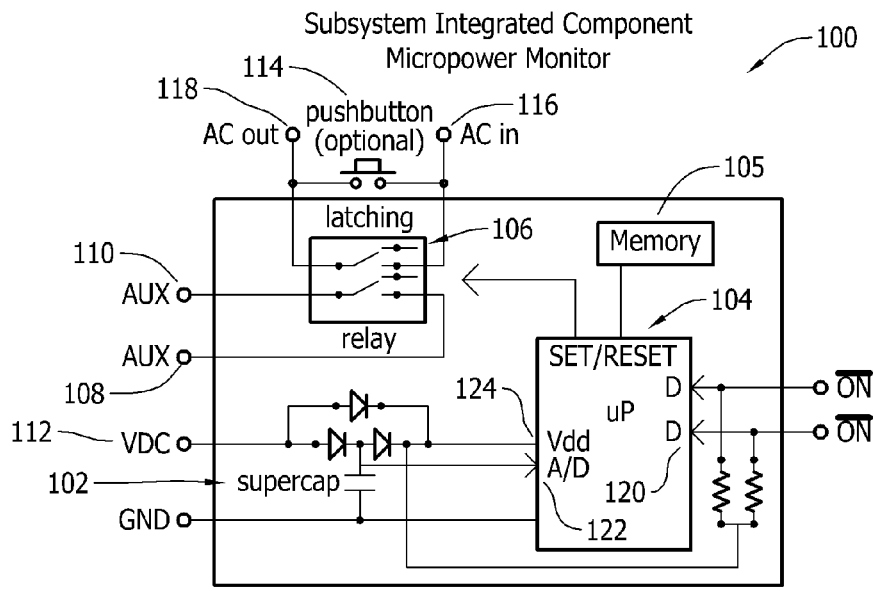
FIG. 1 is block diagram of an exemplary electronic energy management control component for an electrical device or appliance.

A variety of electrical products and systems have been available for some time that are more energy efficient than conventionally provided devices. Much success has been enjoyed in reducing energy consumption of such devices while in active use. For example, modern heating, ventilation, and cooling (HVAC) systems, refrigerators, dishwashers, and microwave ovens, among others, now provide comparable performance in use while using less electrical power than before.

Many electronic appliance items and devices, including but not limited to audio/video receivers, DVD players, televisions, monitors, game players, personal computers, notebook computers, and hand held electronic devices of all kinds are likewise commonly designed with energy saving features in mind while they are operating. Such energy savings can be appreciable over time, and are consequently frequently promoted by product manufacturers and often favored by consumers for use in residential and commercial environments. Indeed, for some consumers, relative energy consumption between different brands and models of appliances can be a deciding factor in making purchase decisions.

While many modern electrical appliances and devices offer energy savings in use, many consumers are unaware that many of their appliance devices consume energy even when not in use. Especially for larger, non-mobile electronic appliances including power cords, as long as the devices are plugged into an AC outlet via the power cord they may consume some amount of power even when, from the layman user's perspective, they are turned off and not being used. Appliance devices universally include some form of power input switch in which a user can turn the device "on" for active use and turn "off" when not in use.

In many modern appliance devices, however, when a user turns the device off after use, the device enters another operating state, and typically a lower power state, in which the core user functionality is disabled, but other functionality continues. Such alternative operating states are referred to by various names, including but not limited to an idle state or a standby state. Appliances and devices of this type, in most cases, are never truly completely "off" except perhaps in the case of extended power loss in the main power supply connected to the device or in extended time periods wherein the device is unplugged from a power outlet. For shorter power losses or interruptions, including unplugging of the appliance device, energy storage elements provided in the device can continue to power an idle or standby state for some period of time.

For many types of electronic devices, there are valid design considerations and reasons why energy consumption in an idle state exists and is desirable. For example, clocks, indicators, displays and remote control functionality can be facilitated in such idle or standby states. Additionally, memory storage is facilitated in the idle or standby modes wherein user preferences and options set by the user may be stored, as well as other data of interest, such as historical data regarding, for example, activities in progress (e.g., a specific point in a DVD movie or game related information) or otherwise saved by the user before the device was powered off. By storing such information, when the device is turned on again, the user may conveniently continue the activity that was in progress, review desired information and settings, or may save desired information for later use and recall.

Also, for appliance devices like audio/video receivers, televisions, DVD players, and gaming systems, all of which may be web connectable nowadays, the setup of such devices can involve selection, or de-selection, of numerous options that are preferably coordinated among the devices. As such the setup can be fairly time intensive to achieve optimal results, and some purchasers choose to invest in professional installation and setup of such devices rather than do it themselves. Once successfully completed, storage of the selected options and parameters is highly desirable in that the comprehensive setup process in generally needs only to be performed once. Thereafter, the various devices can remember their respective settings, and the user can simply enjoy them.

Still further, if power continues to be supplied after the device or appliance is turned off, in certain instances start up times for the appliance or device may be much shorter and/or performance may be improved when starting from a standby mode, as opposed to a completely de-energized state, when the appliance or device is turned on for use. This can be especially true for computer equipment, printers, copiers, facsimile devices, and certain types of home theater equipment.

Even though the power requirements in an idle or standby states may be a small fraction of the power requirements when the devices are on and in use, such idle power consumption considered cumulatively across a number of devices can still be significant. For consumers that only use the devices infrequently, such that the devices are idle or on standby for extended periods of time, the desirability and benefits of idle and standby states is diminished. When such devices are only infrequently used, idle state energy consumption can be counterproductive and can call the benefits of providing idle or standby states into question.

For portable electronic devices, rechargeable batteries are typically provided. Chargers and adapters including power cords that connect to a power outlet on one end and to the portable device on the other end are generally available for such portable devices. Such chargers and adapters convert AC electrical power from a power outlet to DC power to power the device, or from a DC power supply such as a vehicle battery to appropriate DC power to operate the device. As such, the electronic devices can be powered by alternative power supplies for use, while simultaneously re-charging the battery or batteries in the device when needed. Portable or mobile electronic devices such as cellular phones, smart phones, notebook computers, tablet computers, portable DVD players, audio and video media devices, portable gaming devices, portable global positioning system (GPS) devices, digital camera devices, and video recorders, among others, are often provided in such a manner. Many consumers tend to plug the charger(s) for such devices into respective wall outlets and leave them plugged in, whether or not the charger is actually connected to the portable electronic device. This is sometimes referred to as a no-load condition.

Many consumers fail to realize that the typical charger appliance will continuously consume electrical power in a no load state. That is, many consumers may falsely believe that the charger will not consume power unless it is actually connected to the electrical device and being used for charging purposes, even when it is plugged into a wall outlet. Unlike other appliance devices discussed above where there may be good reason to continue to power the device in an idle state, in charger appliances there is no benefit to such energy consumption in a no-load state. It is simply wasted power, and according to some, wasted power of the worst kind because it is completely avoidable, very common, and frequently overlooked.

Many consumers nowadays may own multiple portable electronic devices and have multiple chargers for them. For households in which each member owns one or more devices and chargers, many of which will remain plugged in when not used for charging, the issues are multiplied. The proliferation of business users of such portable electronic devices has in many cases led consumers to own more than one charger and keep them in different locations (e.g., at home and at work) and often plugged in. When traveling, consumers are known to take their chargers with them and while they sleep, plug the chargers in to charge their electronic devices. In such a situation, the chargers are typically operated for much longer periods than is actually necessary to charge the battery of the device. Many consumers may not know that many types of chargers continue to draw power even after full charging of the battery or batteries in the electronic device has been achieved.

According to some reports, 10% to 15% of the typical electrical energy consumption per year in the typical household may be attributable to power consumed by electronic devices and appliances when in an idle state, a standby state, or in the case of charger appliances, a no load state. Hundreds of dollars per year may accordingly be spent on powering various electronic appliances and devices when not in active use. Such power consumption is sometimes referred to as "vampire power" because it is both unsuspecting to many consumers and negatively parasitic by nature. Given the apparently never-ending proliferation of consumer electronic devices, whether portable or not, such issues are becoming of increasing concern. For the typical household, the number of electronic devices and appliances contributing to vampire power issues is likely to grow over time, and as such these problems are likely to increase over time.

While efforts have been made to educate and inform energy consumers of such issues, the most typical remedy provided is to advise consumers to unplug their electronic devices and appliances when not in actual use to avoid wasted energy consumption. For many consumers, however, this is inconvenient and, in some cases, impractical advice.

For various reasons, electrical outlets are not always easily accessible, such that plugging in appliance devices in certain locations can simply be challenging, and in such cases once a device has been plugged into a power outlet, the incentive for a user to unplug it is minimal. Indeed, for avid consumer electronic users, just finding enough outlets to charge their devices can be a challenge, especially when traveling. Also, and especially for frequently used portable electronic devices needing frequent charging, many consumers find it simply easier to plug their chargers in at a convenient location and leave them in place rather to plug and unplug them each time they are used. For some consumers with physical impairments, they may not be able to plug and unplug the devices to save energy even if they wanted to. Finally, there is, of course, a segment of the population that simply remains unaware of vampire power consumption issues, does not fully understand it or appreciate it, or has simply chosen to ignore it.

Adapters and chargers are available for powering portable electronic devices from vehicle electric systems as well, with similar issues and results. Modern vehicles today are typically provided with a number of power outlets distributed throughout the vehicle to accommodate a number of such portable electronic devices at various locations in the vehicle. However, many a vehicle owner has encountered a dead battery because of a connected portable electronic device that drained the vehicle battery while the vehicle was parked with the ignition off for some period of time. Such surprises are, of course, unwelcome, and this is another area where many consumers fail to understand how the portable devices and/or their chargers or adapters actually operate. Such confusion is perhaps only increased as some types of portable devices, when used with their chargers/adapters in a vehicle, are designed to recognize when the ignition has been turned off and power themselves down to minimize any chance of draining the vehicle battery. While some devices certainly do effectively function in such a manner, not all of them do and problems remain.

Likewise, modern vehicles can include intelligent features to disconnect devices to prevent the vehicle battery from being depleted. Connected devices may, for example, automatically be disconnected after a certain period of time after the vehicle ignition is turned off. Such features, however, may be switched on or off by the user of the vehicle, knowingly or unknowingly. Thus, confusion and problems may nonetheless result that will defeat even well designed vehicle system features to prevent inadvertent power drains of the vehicle battery.

While various systems and methods have been proposed for counteracting wasteful energy consumption of the type described in various applications, none is believed to have provided a simple, practical, convenient and affordable solution. Rather, existing systems and methods designed to address such issues are believed to be complicated, unnecessarily expensive, impractical or inconvenient, and subject to human error.

Exemplary electrical device and appliance controls, systems and methods are described hereinbelow to automatically disconnect an electronic device or appliance from a main power supply (e.g., AC power mains or a vehicle battery) when idle and not in use, and to reconnect the main power supply when use is required, in a relatively simple and low cost manner. Implemented in processor based controls, the inventive systems and methods eliminate the wasted idle power consumption of these devices, and also obviate any need to unplug the electrical device or appliance from the main power supply. Any of the electronic devices and appliances discussed above may benefit, as well as others. The devices and applications described herein are exemplary only, and are provided for the sake of illustration rather than limitation. Any electric appliance or device presenting similar energy consumption issues to those described above may benefit from the inventive concepts disclosed, whether or not specifically referenced in the present disclosure.

The benefits are accomplished, as explained below, by utilizing a supercapacitor to supply energy to processor based controls associated with the electronic device or appliance during the time that the power supply is disconnected. Since power supply disconnect times can vary from very short durations to weeks and months, and the supercapacitor energy storage will often be completely consumed when the disconnect times are long, problems of re-powering the devices after long disconnect times are avoided. Compared to other types of energy storage devices such as batteries, supercapacitors offer lower cost and near-infinite life. All battery technologies have a finite life.

Figure 2:
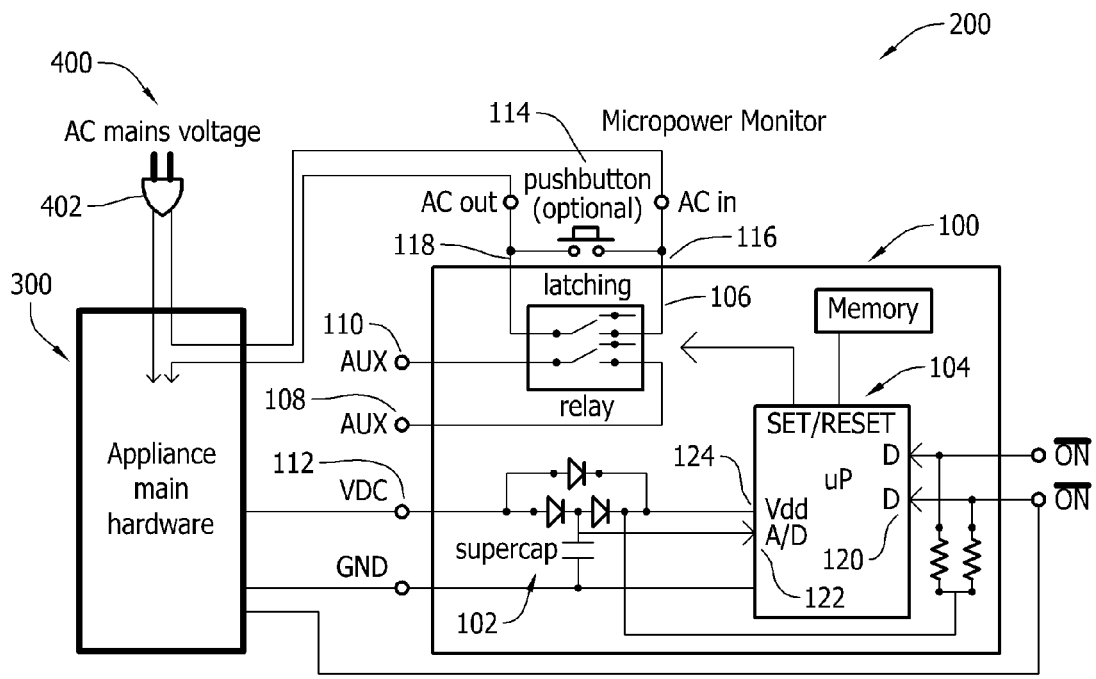
FIG. 2 illustrates an exemplary electrical power management system including the control shown in FIG. 1 and an appliance.

The inventive concepts are illustrated in the block diagrams of FIGS. 1 and 2. Method aspects will be in part apparent and in part explicitly discussed in relation to the algorithm of FIG. 3.

Turning now to FIG. 1, an exemplary control 100 is shown in FIG. 1 as a component separate from an electronic device or system 200 shown in FIG. 2. The system 200 may include the appliance 300 that in normal use is powered by a main power supply 400 via a connecting plug 402 of a power cord. While shown as a separate component, the control 100 may be integrated in the appliance 300 itself, or may be a module added to the appliance 300. As such, the control 100 may be integrally provided with the appliance 300 or retrofit to an existing appliance 300.

As still another embodiment, the plug 402 may be associated with a charger appliance device that is separately provided from the appliance 300. In such an embodiment the appliance 300 may be a portable, battery powered device, with the charger providing alternative power when connected to the main power supply 400 and to the appliance 300, as well as capability to re-charge the battery or batteries in the appliance 300.

Fundamental to the control component 100 shown in FIG. 1 is an energy storage device 102, a monitoring device or controller 104 powered by the energy storage device 102, a memory 105 associated with the monitoring device 104, and a switch 106 than can be activated by the monitoring device 104 to open and close and therefore connect and disconnect the appliance 300 and the main power supply 400 as explained below.

In the example shown in FIG. 1 the energy storage device 102 is preferably a supercapacitor generally having less storage capacity than a battery of similar size, although other energy storage devices including but not limited to batteries could potentially be used in other embodiments. The monitoring device 104 may be a microprocessor that operates with micropower, and the switch 106 may be a latching relay. In the exemplary embodiment shown, the latching relay 106 includes two poles such as that shown, with one of them connecting or disconnecting the main power supply 400 and the other connecting or disconnecting an AUX input 108 and AUX output 110. In another embodiment, a single pole switch could be used if desired.

While a specific type of energy storage device 102, monitoring device 104 and switch 106 have been identified, it is recognized that other alternative devices are known and could be utilized with similar effect. As the construction and operation of supercapacitors, microprocessors, and relays are well known and familiar to those in the art, as well as other components offering similar functionality, they will not be specifically described further herein.

The microprocessor 104 has at least one digital input 120 (also shown as D in FIGS. 1 and 2) wired so as to sense any voltage change applied to it and has as well at least one analog-to-digital input 122 (also shown as A/D in FIGS. 1 and 2) wired to sense the voltage on the supercapacitor 102. Lastly, in the example shown, at least one DC voltage input 112 provides a voltage input to both the supercapacitor 102 and microprocessor 104. In the exemplary embodiments shown in FIGS. 1 and 2, the latching element 106 connects or disconnects the power supply 400 via respective power in and out lines 116, 118.

In the example shown, control 100 is a programmable processor-based device including a processor 104 and a memory storage 105 wherein executable instructions, commands, and control algorithms, as well as other data and information such as communication network and protocol parameters required to satisfactorily operate the appliance 300 are stored. The memory 105 of the processor-based device may be, for example, a random access memory (RAM), and other forms of memory used in conjunction with RAM memory, including but not limited to flash memory (FLASH), programmable read only memory (PROM), and electronically erasable programmable read only memory (EEPROM).

As used herein, the term "processor-based device" shall refer to devices including a processor or microprocessor as shown for controlling the functionality of the device, but also other equivalent elements such as, microcontrollers, microcomputers, programmable logic controllers, reduced instruction set (RISC) circuits, application specific integrated circuits and other programmable circuits, logic circuits, equivalents thereof, and any other circuit or processor capable of executing the functions described below. The processor-based devices listed above are exemplary only, and are thus not intended to limit in any way the definition and/or meaning of the term "processor-based device."

In the examples shown the main power supply 400 corresponds to alternative current (AC) mains voltage such as 120V, 60 Hz, single phase power common to residential power systems, although other types of AC power supplies are possible operating at different voltages, different frequencies or having various numbers of phases. It is also recognized that the main power supply 400 may alternatively be, for example, a 12V to 15V, direct current (DC) power supply such as a battery or batteries of a vehicle electrical power system. In a vehicle system, the battery or batteries may be part of a main power system or an auxiliary power system for operating accessories and auxiliary applications. The appliance 300 may represent any original equipment capable of being powered when the vehicle is off, or any aftermarket appliance or accessory installed to the vehicle, as well as any portable electronic device that may be temporarily used in the vehicle.

In the context of a vehicle and various electrical devices and appliances connected to the vehicle electric system, the vehicle may in various exemplary embodiments be a passenger vehicle (e.g., motorcycles, cars, trucks and buses designed for road use), a commercial vehicle (e.g., tractor trailers, mail trucks, delivery vehicles, garbage trucks and haulers, forklifts), construction vehicles (e.g., diggers, backhoes, bulldozers, loaders, and earthmoving equipment, graders, rollers, dump-trucks), vehicles of all types equipped for military use, vehicles designed for off-road use (e.g., tractors and other farm vehicles, four wheel drive vehicles, sport utility vehicles, all terrain vehicles, dirt bikes, dune buggies, rock crawlers, sandrails, snowmobiles, golf carts), various types of marine vehicles (e.g., ships, boats, submarines, personal watercraft and other vessels), various types of aircraft (e.g., planes and helicopters), space vehicles (e.g., missiles, rockets, satellites and shuttles), recreational vehicles (e.g., RVs and camper trailers), or other modes of transporting persons or things that are propelled and/or powered by mechanical, electrical and other systems and subsystems.

Optionally, a pushbutton switch 114 is also shown in FIG. 1 providing additional benefits in certain circumstances as explained below.

When the latching relay 106 is in a closed position, sometimes referred to as the SET state, the power supply in line 116 will be connected to the power supply out line 118 and connect the appliance 300 to the main power supply 400, which in turn will power the appliance 300 so that it may operate as intended. This arrangement can be seen depicted in FIG. 2. The appliance 300 is provided full power for normal operation so long as the user desires. It is understood that the appliance 300 may include its own processor based controller and memory for executing the various control algorithms and providing the necessary functionality of the appliance 300. Alternatively, the appliance controller and the control 100 may be integrated such that a single controller may perform both the active operating algorithms of the appliance in active use and the energy management control algorithm and functions described further below.

The powered-on appliance 300 in the SET state supplies voltage to the micropower monitor 104 and to the supercapacitor 102 via voltage input 112 (VDC in FIGS. 1 and 2) and the input 124 (also shown as Vdd in FIGS. 1 and 2), thereby charging or restoring the stored energy of the supercapacitor 102 to its full voltage level whenever the appliance 300 is operating. When the relay 106 is switched to an open position or state, sometimes referred to as the RESET state, by the micropower monitor 104 the appliance is disconnected from the main power supply 400, the appliance 300 shuts completely off and VDC 112 is no longer present. Then, the supercapacitor 102 supplies the voltage input Vdd in FIGS. 1 and 2 that the micropower monitor 104 requires to operate while the appliance stays in disuse (i.e., in the idle state, standby state or no load state wherein user functionality is disabled).

The normal operation of the micropower monitor 104 is to sense the digital input 120 to determine if there is a voltage change that indicates that the appliance 300 requires AC power 400 (or in the case of a vehicle environment a DC power supply). For example, the user may press an ON button for the appliance 300 that is in turn connected to the microprocessor digital input 120 shown in FIGS. 1 and 2. Since the microprocessor 104 is a micropower device, it can monitor this digital input 120 while it is in a "sleep state", in which an exemplary embodiment the microprocessor 104 may typically consume only a microwatt of power. Even for the brief times the microprocessor 104 is in a wake state its power draw is very small. Therefore, the drain on the energy storage device 102, in this case a supercapacitor, is also very small.

However, an appliance 300 may remain plugged into the AC mains 400 for a very long time before a user operates it. The supercapacitor 102, unlike a battery of equivalent physical size, will exhibit decreasing voltage output in a relatively short time period. The microprocessor 104, while it can operate over a voltage range, has a minimum operating voltage, below which it cannot function. Therefore, the microprocessor 104 is programmed to periodically wake up and make a measurement of the supercapacitor voltage using the analog-to-digital (A/D) input feature of the microprocessor 104. If the voltage on the supercapacitor 102 is found to be approaching the minimum operating voltage for the microprocessor 104, the microprocessor 104 will put the latching relay 106 in the SET state, which will connect the AC mains 400 so that voltage appears at VDC input 112 and becomes available to charge the supercapacitor 102. Once the supercapacitor 102 is re-charged, which takes typically only seconds, the microprocessor 104 can return to its very low power sleep state.

Now, the appliance 300 may be unplugged (i.e., the plug 402 may be unplugged from the power supply outlet) at the time the microprocessor 104 requires the supercapacitor 102 to be re-charged. In this case there will not appear any voltage at VDC input 112. The measurement that the microprocessor 104 makes will permit the identification of an unplugged appliance 300 since the voltage value delivered by the appliance 300 via VDC input 112 will not appear. Instead, the voltage value will remain as that having been measured of the supercapacitor 102. Therefore, the microprocessor 104 will leave the latching relay 106 in the SET state and return to the sleep state. At this point the microprocessor 104 can subsequently become inoperative due to insufficient operating voltage, yet when the appliance 300 is eventually plugged into the AC mains 400, the microprocessor 104 will again be provided with AC power which in turn will re-charge the supercapacitor 102 and restore the microprocessor 104 to full operation. The microprocessor 104 will at this time re-enter its normal program flow of checking for appliance use input on its digital input 112 and setting the latching relay 106 accordingly.

Figure 3:
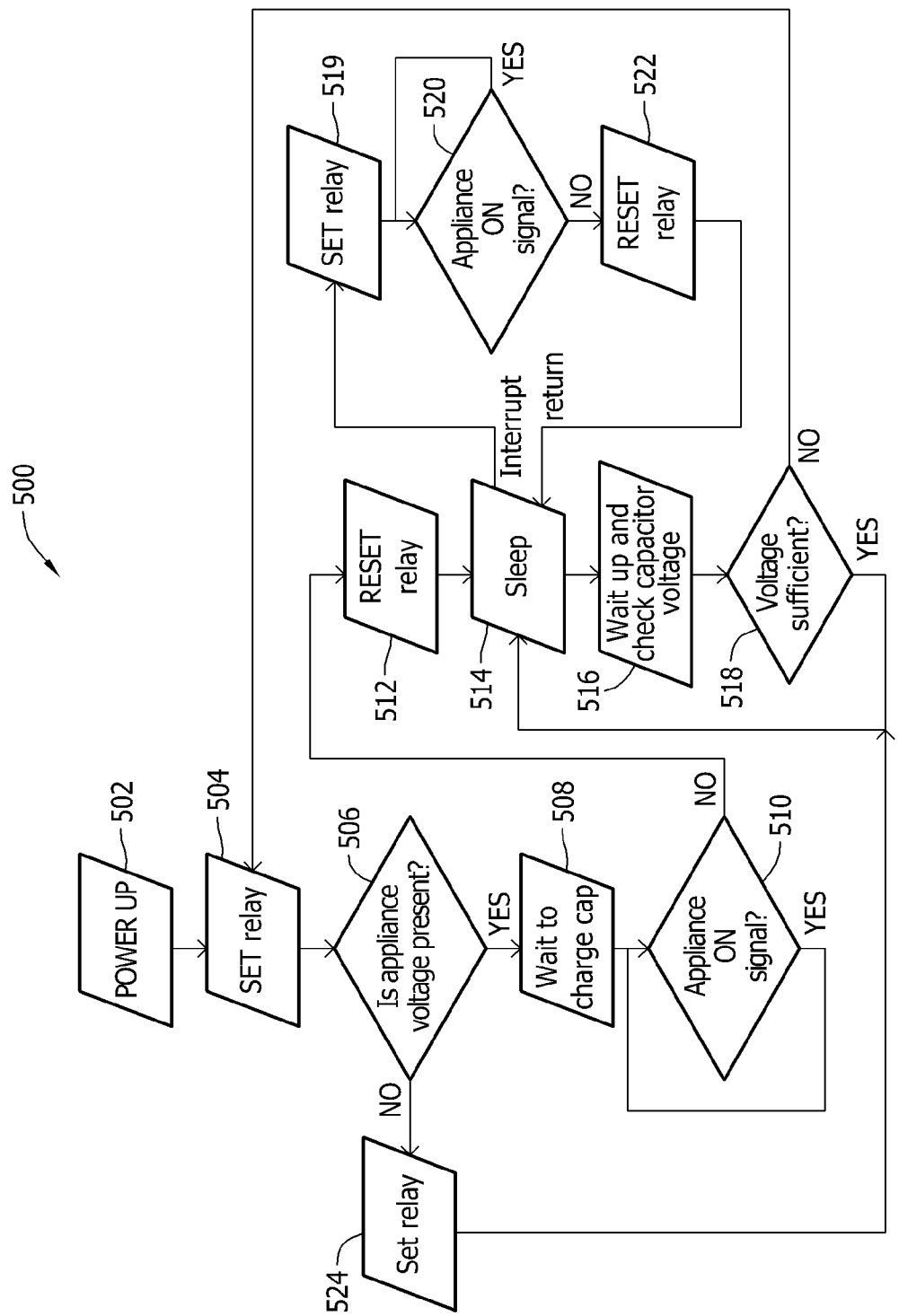
FIG. 3 illustrates an exemplary flow chart of an energy management control algorithm executable by the control component shown in FIG. 1 in the system shown in FIG. 2.

Referring now to FIG. 3, an exemplary control algorithm 500 is shown that may be implemented by the control 100 (FIG. 1), and specifically by the monitoring element 104 thereof, for the benefit of the system 200. As shown in FIG. 3, the algorithm 500 includes the initial step 502 of powering up the control 100, typically when the appliance 300 is first plugged into the main power supply 400. Upon power up, the switch 106 is initially set to latch to SET. At step 506, the monitoring element checks to see if the appliance voltage is present via the VDC input 112 (i.e., whether the appliance is plugged into an operable power source such as the AC mains voltage 400 shown in FIG. 2, or alternatively a main DC power supply such as a vehicle battery).

If the appliance voltage is present at step 506, the controller waits for the capacitor 102 to charge to its full energy level at step 508. The monitoring element 104 then checks for an appliance ON signal, via the input 120, at step 510. If the appliance is ON, as determined by the user, the monitoring element returns and continues to check for the ON signal. As long as the appliance is ON, the control 100 takes no further action. When the user turns the appliance ON, the energy saving capability provided by the control 100 in the idle state, standby state, or no-load state is inapplicable.

When the appliance ON signal is no longer present at input 120, the appliance has been turned OFF by the user and the monitoring element 104 causes the switch 106 to latch to RESET as shown at step 512. Once this is accomplished, the appliance 300 is disconnected from the main power supply and stops drawing power. The energy stored in the supercapacitor 102 may from this moment on power the monitoring element 104. The monitoring element 104 subsequently enters a sleep state 514 in order to preserve the energy stored in the supercapacitor. At a predetermined time, however, the monitoring element 104 wakes up and checks the voltage of the supercapacitor 102 as shown at step 516. The monitoring element 104 then checks to see if the voltage of the supercapacitor is sufficient at step 518.

If at step 518 the voltage of the supercapacitor is sufficiently above a predetermined threshold, which may be selected based on a minimum power requirement of the monitoring element 104, the voltage is deemed sufficient. No further action need be taken at this point and the monitoring element 104 returns to sleep at step 514.

If at step 518 the voltage of the supercapacitor is approaching the predetermined threshold, the monitoring element 104 returns to step 504 and causes the switch 106 to latch to SET. The controller then proceeds again, as shown at step 506, to see if appliance voltage is present via the VDC input 112. If appliance voltage is present, at step 508 the controller again waits an appropriate amount of time for the supercapacitor 102 to re-charge. The controller then follows steps 510, 512 and 514 and returns to sleep.

As also shown in FIG. 3, a user turning the appliance ON will cause a change of state of the digital input 120, which in turn generates a hardware flow control interrupt. Specifically, the monitoring element 104 responds to an occurrence of the appliance ON signal by waking up and as shown at step 519 causing the switch 106 to latch to SET. Thereafter, as long as the appliance stays on, the appliance ON signal will remain present and the monitoring element 104 will loop through the step 520 and continue to check for the appliance ON signal.

When the appliance ON signal disappears the appliance has been turned OFF and as shown at step 522, the monitoring element 104 causes the switch 106 to latch to RESET and disconnect the appliance 300 from the power supply 400. The monitoring element 104 then returns to sleep at step 514 and the algorithm continues.

If at step 506 it is determined that appliance voltage is not present, the monitoring element 104 operates the switch 106 to latch to SET as shown at step 524. If there is charge in the supercapacitor 102, the monitoring element 104 returns to step 514 and goes to sleep. As such, the control 100 can operate for some period of time if power is lost or if the appliance 300 is unplugged. If either occurs for long enough to deplete the energy stored in the supercapacitor 102, the control will cease to operate, and when power is restored or the appliance 300 is plugged back in, the algorithm will start completely over at step 502 by powering up. Data storage and information associated with operation of the appliance 300 may be stored in memory in the appliance and powered for some period of time when the appliance 300 is disconnected from the main power supply 400 via higher capacitor energy storage elements in the appliance as has been conventionally done. As such, the data storage in the appliance is unaffected when the energy management control 100 ceases to operate as the supercapacitor voltage is exhausted, and upon power up of the appliance 300 the data will be available to the appliance 300 for recall and use as desired.

The algorithm 500 is generally applicable to a variety of appliances and power supplies. The appliances may be portable devices or non-portable devices of all types. The power supply may supply AC or DC power, and accordingly may be used in appliances and accessories associated with vehicle electrical systems providing main or auxiliary power to vehicle subsystems.

Additional processes and steps may also be performed in the algorithm 500 while achieving similar results. The algorithm 500 may further be combined with other processes and algorithms in an appliance or device. While an exemplary sequence of steps has been described, it is appreciated that variations to the sequences shown and described are possible to achieve similar results. The algorithm 500 is accordingly exemplary only and is provided for the purposes of illustration rather than limitation.

The benefits of the control 100, system 200 and algorithm 500 are believed to be numerous. Wasted power consumption by the appliance 300 in idle, standby or no-load states may be dramatically reduced, and practically speaking, mostly eliminated. As such, the power consumption of the appliance or device in an inactive state may approach zero, and the control 100 is accordingly sometimes referred to as a zero power control. The monitoring element 104 draws very little power and the supercapacitor 102 can be charged and re-charged with very little power. The connecting and disconnecting of the power supply 400 occurs automatically without any action needed by a person, and the operation of the control 100 can work in a manner that is generally transparent to the user of the device. Energy consumption can accordingly be reduced without any effort made on the part of the user, and even without their knowledge. Human error in the algorithm and associated methods and system is entirely avoided.

The periodic waking up to re-charge the supercapacitor 102 allows relatively low energy storage capacity to be used effectively, and as such the supercapacitor 102 may be used rather than relatively expensive and higher capacity battery storage. A battery of equivalent physical size would provide additional energy storage to tolerate an appliance that is unplugged for months but at much higher cost. By setting of the latching relay 106 to SET as shown at step 524 when the appliance 300 is found to be unplugged, a much lower capacity supercapacitor may be used because, even though the energy stored in the supercapacitor 102 may be exhausted much more quickly, the appliance will power up normally when plugged back in.

The optional pushbutton 114 (FIG. 1) provides an additional feature of providing a way for the system 200 to be initialized to a condition where the latching relay 106 is placed in the SET state. This feature would typically be used in manufacturing after initial assembly of the unit when the initial state of the latching relay 106 is unknown. If the relay 106 were latched in the RESET position upon power up at step 502, the algorithm 500 would not work to charge the supercapacitor.

The control 100 can be constructed from available components and programmed relatively easily to accomplish the functionality described. Having described the functionality, it is believed that those in the art could implement the control 100 without further explanation.

The benefits and advantages of the inventive technology discloses is now believed to be apparent from the exemplary embodiments disclosed.

An embodiment of an energy management control for an electrical device powered by a main power supply has been disclosed. The electrical device us configured for full power operation in a first mode for active use and a second mode when inactive, wherein the second mode includes one of an idle, state, a standby state, and a no-load state. The control comprises: a processor based device; a switch operable by the processor based device to connect or disconnect the electrical device from the main power supply; and an energy storage element operable to power the processor based device when the main power supply is disconnected via the switch and when the electrical device is in the second mode; wherein the processor based device is configured to monitor a first voltage of the energy storage element and a second voltage corresponding to operation of the electrical device in the first mode; and wherein the processor based device is configured to operate the switch to connect and disconnect the electrical device from the main power supply in response to a predetermined change in at least one of the first and second voltages.

Optionally, the processor based device may comprise a microcontroller. The energy storage element may be a supercapacitor. The processor device may be configured to operate the switch to disconnect the electrical device from the main power supply when the second voltage disappears, thereby indicating that the electrical device has assumed the second mode. The processor based device may further be configured to enter a low power sleep state and periodically wake up from the sleep state to monitor the first voltage. The processor based device may be configured to reconnect the electrical device to the power supply when the first voltage approaches a predetermined threshold. If the first voltage is above a predetermined threshold, the processor based device may be configured to return to the low power sleep state. The processor based device may be configured to operate the switch to connect the main power supply to the electrical device whenever the second voltage is present.

The processor based device may be configured to selectively operate the switch to connect and disconnect the electrical device from the main power supply in response to a predetermined change in both of the first and second voltages. The control of claim may also include a pushbutton associated with the switch.

An embodiment of an energy management system for an electrical appliance powered by a main power supply is also disclosed. The electrical appliance is configured for operation in a first mode for active use and a second mode when inactive, the second mode including one of an idle, state, a standby state, or a no-load state. A control is configured to interface the main power supply and the electrical appliance, the control comprising: a processor based device; a switch operable by the processor based device to connect or disconnect the appliance device from the main power supply; and an energy storage element operable to power the processor based device when the main power supply is disconnected via the switch and when the electrical device is in the second mode; wherein the processor based device is configured to monitor a first voltage input associated with the energy storage element and a second voltage input; wherein operation of the electrical appliance in the first mode presents a voltage signal on the second voltage input and wherein the voltage signal disappears when the electrical appliance enters the second mode; and wherein the processor based device is configured to operate the switch to disconnect the electrical appliance from the main power supply when the second voltage disappears.

Optionally, the processor based device may further be configured to operate the switch to reconnect the electrical appliance to the main power supply whenever the second voltage appears. The processor based device may further be configured to monitor the first voltage input while the electrical appliance is disconnected from the main power supply, and compare the first voltage to a predetermined voltage threshold. The processor based device may further be configured to operate the switch to reconnect the electrical appliance to the main power supply as the first voltage approaches the predetermined threshold. The predetermined threshold may correspond to a minimum voltage requirement for the processor based device. The processor based device may further be configured to enter a low power sleep state and periodically wake up from the sleep state to monitor the first voltage. The processor based device may also be configured to re-enter the low power sleep state when the first voltage is sufficiently above the predetermined threshold.

The processor based device may comprise a microcontroller, the energy storage element may be a supercapacitor, and the control may be integrated with the electrical appliance. The electrical appliance may be one of a charger appliance, a power adaptor, a portable electronic device, a non-portable electronic device, and an appliance associated with a vehicle electrical power system. The control may further comprise a pushbutton associated with the switch.

An embodiment of an energy management system has also been discloses. The system comprises: an electrical appliance configured to be powered by a main power supply, the electrical appliance configured for operation in a first mode for active use and a second mode when inactive, the second mode including one of an idle, state, a standby state, or a no-load state; and a control associated with the appliance and configured to interface the main power supply and the electrical appliance. The control comprises: a processor based device operable in a waking state and a low power sleep state; a switch operable by the processor based device to connect or disconnect the appliance device from the main power supply in the waking state; and an energy storage element operable to power the processor based device when the main power supply is disconnected via the switch and when the electrical device is in the second mode. The processor based device is configured to monitor a first voltage input associated with the energy storage element and a second voltage input; wherein operation of the electrical appliance in the first mode presents a voltage signal on the second voltage input and wherein the voltage signal disappears when the electrical appliance enters the second mode; wherein the processor based device is configured to operate the switch to disconnect the electrical appliance from the main power supply when the second voltage disappears; and wherein the processor based device is configured to enter the low power sleep state when the second voltage disappears, and thereafter to periodically enter the waking state to monitor the first voltage.

Optionally, the processor based device may be further configured to enter the waking state and operate the switch to reconnect the electrical appliance to the main power supply whenever the second voltage appears. The processor based device may further be configured to: compare the first voltage to a predetermined voltage threshold when in the waking state; and if the first voltage is sufficiently above a predetermined threshold, re-enter the low power sleep state; or if the first voltage is approaching the predetermined threshold, operate the switch to reconnect the electrical appliance to the main power supply until the energy storage element is re-charged.

The processor based device comprises may be a microcontroller, the energy storage element may be a supercapacitor, and the control may be integrated with the electrical appliance. The electrical appliance may be one of a charger appliance, a power adaptor, a portable electronic device, a non-portable electronic device, and an appliance associate with a vehicle electrical power system. The control may further include a pushbutton associated with the switch. The appliance may include a power cord and a plug adapted for connection to the main power supply. The appliance may be configured to be powered by an AC electrical power supply in the first mode, or may be configured to be powered by a DC electrical power supply in the first mode.

A method of managing energy consumption by an electrical device has also been disclosed. The electrical device is configured to be powered by at least one of an AC main power supply and a DC main power supply. The electrical device is further operable in a first, full power mode of operation for active use and a second, reduced power mode of operation when inactive. The second mode is one of an idle, state, a standby state, or a no-load state. The method utilizes a control including: a processor based device; a switch operable by the processor based device to connect or disconnect the electrical device from the main power supply; and an energy storage element operable to power the processor based device when the main power supply is disconnected via the switch and when the electrical device is inactive. The method includes: monitoring a first voltage of the energy storage element with the processor based device; monitoring a second voltage associated with operation of the electrical device in the first mode with the processor based device; operating the switch, with the processor based device, to connect the electrical device to the main power supply whenever the second voltage appears; operating the switch, with the processor based device, to disconnect the electrical device from the main power supply whenever the second voltage disappears; and powering the processor based device with the energy storage element while the electrical device is disconnected from the main power supply.

Optionally, the method may further comprise: the processor based device entering a low power sleep state when the second voltage disappears; and thereafter the processor based device entering a waking state to monitor the first voltage. The method may likewise include: comparing, with the processor based device, the first voltage to a predetermined voltage threshold when in the waking state; and if the first voltage is sufficiently above a predetermined threshold, re-entering the low power sleep state. The method may include: if the first voltage is approaching the predetermined threshold, operating the switch with the processor based device to reconnect the electrical appliance to the main power supply. The method may include: monitoring the first voltage with the processor based device while the electrical appliance is reconnected to the power supply; and operating the switch with the processor based device to disconnect the electrical appliance to the main power supply when the first voltage reaches a predetermined re-charged voltage for the energy storage element. Interfacing the control with the appliance and the main power supply may include plugging a power cord into the main power supply. The method may comprise interfacing the control with the electrical device and the main power supply.

The method may also include: integrating the control with the electrical device, or retrofitting the control to the electrical device. Interfacing the control with the electrical device and the main power supply may include interfacing the control with an AC main power supply. The energy storage element may be a supercapacitor. The electrical device may be one of a charger appliance, a power adaptor, a portable electronic device, a non-portable electronic device, and an appliance associated with a vehicle electrical power system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An energy management control for an electrical device powered by a main power supply, the electrical device configured for full power operation in a first mode for active use and a second mode when inactive, wherein the second mode includes one of an idle state, a standby state, and a no-load state, the energy management control comprising:
    a processor based device;
    a switch operable by the processor based device to connect or disconnect the electrical device from the main power supply; and
    an energy storage element operable to power the processor based device when the main power supply is disconnected via the switch and when the electrical device is in the second mode;
    wherein the processor based device is configured to:
        monitor a first voltage of the energy storage element and a second voltage corresponding to operation of the electrical device in the first mode;
        operate the switch to connect and disconnect the electrical device from the main power supply in response to a predetermined change in at least one of the first and second voltages;
        operate the switch to disconnect the electrical device from the main power supply when the second voltage disappears, thereby indicating that the electrical device has assumed the second mode; and
        enter a low power sleep state and periodically wake up from the low power sleep state to monitor the first voltage.

2. The control of claim 1, wherein the processor based device comprises a microcontroller.

3. The control of claim 1, wherein the energy storage element is a supercapacitor.

4. The control of claim 1, wherein the processor based device is further configured to reconnect the electrical device to the main power supply when the first voltage approaches a predetermined threshold.

5. The control of claim 1, wherein, if the first voltage is above a predetermined threshold, the processor based device is configured to return to the low power sleep state.

6. The control of claim 1, wherein the processor based device is further configured to operate the switch to connect the main power supply to the electrical device whenever the second voltage is present.

7. The control of claim 1, wherein the processor based device is further configured to selectively operate the switch to connect and disconnect the electrical device from the main power supply in response to a predetermined change in both of the first and second voltages.

8. The control of claim 1, further comprising a pushbutton associated with the switch.

9. An energy management system for an electrical appliance powered by a main power supply, the electrical appliance configured for operation in a first mode for active use and a second mode when inactive, the second mode including one of an idle state, a standby state, or a no-load state; and a control configured to interface the main power supply and the electrical appliance, the control comprising:
    a processor based device;
    a switch operable by the processor based device to connect or disconnect the electrical appliance from the main power supply; and
    an energy storage element operable to power the processor based device when the main power supply is disconnected via the switch and when the electrical appliance is in the second mode;
    wherein the processor based device is configured to monitor a first voltage input associated with the energy storage element and a second voltage input;
    wherein operation of the electrical appliance in the first mode presents a voltage signal on the second voltage input and wherein the voltage signal disappears when the electrical appliance enters the second mode;
    wherein the processor based device is further configured to:
        operate the switch to disconnect the electrical appliance from the main power supply when the second voltage disappears; and
        enter a low power sleep state and periodically wake up from the low power sleep state to monitor the first voltage.

10. The system of claim 9, wherein the processor based device is further configured to operate the switch to reconnect the electrical appliance to the main power supply whenever the second voltage appears.

11. The system of claim 9, wherein the processor based device is further configured to monitor the first voltage input while the electrical appliance is disconnected from the main power supply, and compare the first voltage to a predetermined voltage threshold.

12. The system of claim 11, wherein the processor based device is further configured to operate the switch to reconnect the electrical appliance to the main power supply as the first voltage approaches the predetermined threshold.

13. The system of claim 11, wherein the predetermined threshold corresponds to a minimum voltage requirement for the processor based device.

14. The system of claim 9, wherein the processor based device is further configured to re-enter the low power sleep state when the first voltage is sufficiently above the predetermined threshold.

15. The system of claim 9, wherein the processor based device comprises a microcontroller.

16. The system of claim 9, wherein the energy storage element is a supercapacitor.

17. The system of claim 9, wherein the control is integrated with the electrical appliance.

18. The system of claim 9, wherein the electrical appliance is one of a charger appliance, a power adaptor, a portable electronic device, a non-portable electronic device, and an appliance associated with a vehicle electrical power system.

19. The system of claim 9, wherein the control further comprises a pushbutton associated with the switch.

20. An energy management system comprising:
    an electrical appliance configured to be powered by a main power supply, the electrical appliance configured for operation in a first mode for active use and a second mode when inactive, the second mode including one of an idle state, a standby state, or a no-load state; and
    a control associated with the electrical appliance and configured to interface the main power supply and the electrical appliance, the control comprising:
        a processor based device operable in a waking state and a low power sleep state;
        a switch operable by the processor based device to connect or disconnect the electrical appliance from the main power supply in the waking state; and
        an energy storage element operable to power the processor based device when the main power supply is disconnected via the switch and when the electrical appliance is in the second mode;
        wherein the processor based device is configured to monitor a first voltage input associated with the energy storage element and a second voltage input;
        wherein operation of the electrical appliance in the first mode presents a voltage signal on the second voltage input and wherein the voltage signal disappears when the electrical appliance enters the second mode;
        wherein the processor based device is configured to operate the switch to disconnect the electrical appliance from the main power supply when the second voltage disappears; and
        wherein the processor based device is configured to enter the low power sleep state when the second voltage disappears, and thereafter to periodically enter the waking state to monitor the first voltage.

21. The system of claim 20, wherein the processor based device is further configured to enter the waking state and operate the switch to reconnect the electrical appliance to the main power supply whenever the second voltage appears.

22. The system of claim 20, wherein the processor based device is further configured to:
    compare the first voltage to a predetermined voltage threshold when in the waking state; and
    if the first voltage is sufficiently above a predetermined threshold, re-enter the low power sleep state; or
    if the first voltage is approaching the predetermined threshold, operate the switch to reconnect the electrical appliance to the main power supply until the energy storage element is re-charged.

23. The system of claim 20, wherein the processor based device comprises a microcontroller.

24. The system of claim 20, wherein the energy storage element is a supercapacitor.

25. The system of claim 20, wherein the control is integrated with the electrical appliance.

26. The system of claim 20, wherein the electrical appliance is one of a charger appliance, a power adaptor, a portable electronic device, a non-portable electronic device, and an appliance associated with a vehicle electrical power system.

27. The system of claim 20, wherein the control further comprises a pushbutton associated with the switch.

28. The system of claim 20, wherein the electrical appliance includes a power cord and a plug adapted for connection to the main power supply.

29. The system of claim 20, wherein the electrical appliance is configured to be powered by an AC main power supply in the first mode.

30. The system of claim 20, wherein the electrical appliance is configured to be powered by a DC main power supply in the first mode.

31. A method of managing energy consumption by an electrical device, the electrical device configured to be powered by at least one of an AC main power supply and a DC main power supply, the electrical device further being operable in a first, full power mode of operation for active use and a second, reduced power mode of operation when inactive, the second mode being one of an idle state, a standby state, or a no-load state;

the method utilizing a control including: a processor based device; a switch operable by the processor based device to connect or disconnect the electrical device from the main power supply; and an energy storage element operable to power the processor based device when the main power supply is disconnected via the switch and when the electrical device is inactive;

the method comprising:
- monitoring a first voltage of the energy storage element with the processor based device;
- monitoring a second voltage associated with operation of the electrical device in the first mode with the processor based device;
- operating the switch, with the processor based device, to connect the electrical device to the main power supply whenever the second voltage appears;
- operating the switch, with the processor based device, to disconnect the electrical device from the main power supply whenever the second voltage disappears;
- entering a low power sleep state, via the processor based device, when the second voltage disappears;
- powering the processor based device with the energy storage element while the electrical device is disconnected from the main power supply; and
- entering a waking state, via the processor based device, to monitor the first voltage.

32. The method of claim 31, further comprising:
comparing, with the processor based device, the first voltage to a predetermined voltage threshold when in the waking state; and
if the first voltage is sufficiently above a predetermined threshold, re-entering the low power sleep state.

33. The method of claim 32, further comprising:
if the first voltage is approaching the predetermined threshold, operating the switch with the processor based device to reconnect the electrical device to the main power supply.

34. The method of claim 33, further comprising,
monitoring the first voltage with the processor based device while the electrical device is reconnected to the main power supply; and
operating the switch with the processor based device to disconnect the electrical device to the main power supply when the first voltage reaches a predetermined recharged voltage for the energy storage element.

35. The method of claim 31, wherein interfacing the control with the electrical device and the main power supply comprises plugging a power cord into the main power supply.

36. The method of claim 31, further comprising interfacing the control with the electrical device and the main power supply.

37. The method of claim 31, further comprising:
integrating the control with the electrical device.

38. The method of claim 31, further comprising:
retrofitting the control to the electrical device.

39. The method of claim 31, wherein interfacing the control with the electrical device and the main power supply comprises interfacing the control with an AC main power supply.

40. The method of claim 31, wherein the energy storage element is a supercapacitor.

41. The method of claim 31, wherein the electrical device is one of a charger appliance, a power adaptor, a portable electronic device, a non-portable electronic device, and an appliance associated with a vehicle electrical power system.

* * * * *